United States Patent [19]
Riddle

[11] Patent Number: 6,151,619
[45] Date of Patent: Nov. 21, 2000

[54] METHOD AND APPARATUS FOR MAINTAINING CONFIGURATION INFORMATION OF A TELECONFERENCE AND IDENTIFICATION OF ENDPOINT DURING TELECONFERENCE

[75] Inventor: Guy G. Riddle, Los Gatos, Calif.

[73] Assignee: Apple Computer, Inc., Cupertino, Calif.

[21] Appl. No.: 08/757,016

[22] Filed: Nov. 26, 1996

[51] Int. Cl.[7] .............................. G06F 15/16; G06F 15/17
[52] U.S. Cl. .......................................... 709/204; 345/330
[58] Field of Search ...................... 395/200.34, 200.33, 395/200.35; 345/330, 331, 1, 2; 370/260, 261, 263; 709/204, 205, 203

[56] References Cited

U.S. PATENT DOCUMENTS

| | | | |
|---|---|---|---|
| 5,375,068 | 12/1994 | Palmer et al. ............................ | 364/514 |
| 5,577,208 | 11/1996 | Couturier ............................ | 395/200.04 |
| 5,594,859 | 1/1997 | Palmer et al. ............................ | 395/330 |
| 5,608,653 | 3/1997 | Palmer et al. ....................... | 364/514 C |
| 5,627,978 | 5/1997 | Altom et al. ............................. | 395/330 |
| 5,659,692 | 8/1997 | Poggio et al. ........................... | 395/330 |
| 5,664,126 | 9/1997 | Hirakawa et al. ....................... | 345/329 |
| 5,717,863 | 2/1998 | Adamson et al. .................. | 395/200.34 |
| 5,758,079 | 5/1998 | Ludwig et al. ..................... | 395/200.34 |

*Primary Examiner*—MArk H. Rinehart
*Assistant Examiner*—Marc D. Thompson
*Attorney, Agent, or Firm*—Blakely, Sokoloff, Taylor & Zafman

[57] ABSTRACT

A method and apparatus for initiating a teleconference between two or more digital processing systems. A method according to one aspect of the invention comprises retrieving information containing an address and configuration data for the teleconference and retrieving a teleconference application program and using the information to initiate a teleconference with the teleconference application program where the information is independent of the teleconference application program and may be shared or used by another teleconference application program and is typically stored independently of the teleconference application program. A method according to another aspect of the present invention includes the steps of transmitting a representation of an image to a second processor and prior to receiving a confirmation of an acceptance to begin the teleconference, displaying the image at the second processor. Various examples of apparatuses which may perform these methods are also described.

46 Claims, 12 Drawing Sheets

METHOD AND APPARATUS FOR MAINTAINING CONFIGURATION INFORMATION OF A TELECONFERENCE AND IDENTIFICATION OF ENDPOINT DURING TELECONFERENCE

FIELD OF THE INVENTION

The present invention relates to the field of telecommunication and more particularly to the field of computer controlled video teleconferencing or teleconferencing.

BACKGROUND OF THE INVENTION

The use of digital processing systems, such as general purpose computer systems, to conduct a meeting by "videoconference" is becoming popular. Typically, a computer program, referred to as a teleconferencing application, is run on each computer system involved in the videoconference. Each program typically causes its system to capture images and sound recordings from the user of the system and to transmit this data to the other systems. Moreover, each program typically causes its system to display the transmitted images from the other systems and to reproduce the transmitted sound recordings from the other systems.

Many current teleconferencing applications are designed for small conferences among individuals who have all the information (e.g., names, addresses, configuration parameters, etc.) necessary to initiate a teleconference. For example, with respect to initiating teleconference requests (e.g., calling other computer systems via a teleconferencing application), many such teleconferencing applications were designed so that parties type in the names or addresses of others with whom a teleconference is desired. A user types into a field, or selects from a menu, a list of other users or computer systems with which a teleconference is desired. According to some applications, the user may also include configuration information or other parameters as preferences that will control or effect the teleconference. Typically, the initiator of the teleconference must initially have a list of the addresses of each other party to the teleconference, as well as a means for distinguishing different networks. The initiator must also have a means for distinguishing duplicate names; for example, two persons named "John Smith."

With respect to receiving teleconference requests, a different problem can arise when several individuals, any one of whom might be calling, have the same name; even if the party receiving a call (i.e., a teleconference request) can see the name of the caller, he or she might not know whether the call is one the receiver wants to accept. Even if the receiver can inspect the resource locator or other address of the caller, the receiver might have difficulty identifying the caller. A receiver would have to maintain a database of all possible callers and enough information to inform a user of the receiver of just who a caller is, if the user is going to be able to know who the caller is before answering the call. This problem is exacerbated when the computer system is coupled to a wide area network, or network of networks (like the Internet or World Wide Web) and literally anyone in the world might be calling—how is the receiver to identify the caller without actually accepting the call?

Some applications have ameliorated these problems somewhat by allowing for the creation of work groups that may be addressed collectively. The work group stores the address of each of the other participants in a possible teleconference, so that a user may, by selecting the work group, send a request for teleconference to each other party listed therein. A user either types in the name of the group with which a teleconference is desired, or (if only some of the parties are desired) selects individuals from among the members of the group by using a menu. This is only a limited solution, though, since at least initially the user must still type in the name to create the work group file within the teleconference application. Also, a user must know the name or address of each party with whom a teleconference is desired, and must get the address into the work group by typing without any typographical errors.

Also, a user must use the same teleconference application each time a teleconference with the work group is desired, because teleconferencing applications generally store addresses, if at all, at the application level. There is no guarantee that a later, more useful teleconferencing telecommunications application that may become available in the future would provide reverse-compatibility with any list a user might enter into an application today.

New parties joining preexisting networks face a daunting task of creating work groups, even though the complete work group may exist on another machine. If a new member joins a group of users who already had teleconferencing capabilities over a given network, and the new user also wants the ability to request teleconferences with the previously enrolled members, the new member must launch his or her favorite teleconferencing application and re-enter the complete list of pre-existing members into a file on his or her computer. The list will not be available to any other application on the new member's computer system, though, since the work group is maintained in an address book within the application. Alternately, the new user might copy a version of the application that contains a group file from a preexisting user, but then the new member cannot use an application of his own choosing, since he is limited to a copy from someone else.

The explosion of teleconferencing opportunities on the Internet has made application-based teleconferencing obsolete. The exponential growth in the number of users, each of whom may be a member of any number of user groups and may have any subset of the set of possible teleconferencing applications, make establishment of a teleconference problematic for the sender, and make recognizing a caller problematic for the receiver.

Therefore, it is desirable for a computer system having at least one teleconference application resident thereon to show a picture corresponding to an incoming call, to allow a user of the computer system to decide whether to accept the call. It is also desirable for a computer system to provide the ability to store previously received pictures in a resource, so that when the user wants to initiate a teleconference the user may consult the picture to select other parties. It is further desirable for a computer system to store a list of addresses and other information corresponding to each of a number of other computer systems with which a teleconference might be established. It is further desirable for a resource storing a plurality of addresses to be independent of any particular application, such that any of a number of applications might access the list of addresses stored in the resource, so that, as new teleconference applications become available, permanent reverse compatibility can be assured. It is further desirable for a resource storing a list of addresses of computer systems on one or more networks to be portable, such that the resource may be transferred or copied from one computer system to another, the computer system to which the resource is copied or transferred gaining thereby the ability to initiate teleconferences, or recognize incoming teleconference requests, with any address stored in the resource. It is further desirable that the resource be independent of any particular location, so that a teleconference may be established from any computer system, anywhere in the world, having access to a network medium. It is further desirable that a picture or other graphical image be presented on a computer system when a teleconference request is received, and that such image be presented before the computer system accepts or rejects initiation of a teleconference or otherwise responds.

SUMMARY OF THE INVENTION

This invention relates to computer controlled teleconferences, and more particularly in one embodiment to computer controlled video teleconferencing.

An apparatus, according to an aspect of the present invention, includes a processor coupled to a display, and a memory coupled to the processor, where the memory stores at least one teleconferencing application program. The processor executes the teleconferencing application program to initiate a teleconference using information which is capable of being stored in the memory independently of the teleconferencing application program such that another teleconferencing application program is capable of using said information. This information may be referred to as a teleconference resource.

A method, according to one embodiment of the present invention, is provided for initiating a teleconference. The method comprises retrieving information containing an address and configuration data for the teleconference and retrieving a teleconference application program and using the information to initiate a teleconference with the teleconference application program, where the information is independent of the teleconference application such that another teleconferencing application program is capable of using said information and is typically stored independently in memory from the teleconference application program.

According to another embodiment of the present invention, a computer readable medium containing executable program instructions is provided for use in a digital processing system in order to initiate a teleconference. These instructions, when executed in the digital processing system, cause the system to perform the steps of retrieving information containing an address and configuration data for a teleconference and retrieving a teleconference application program and using the information to initiate the teleconference with the teleconference application program, where the information is independent of the teleconference application.

In an embodiment according to another aspect of the present invention, a method is provided to initiate a teleconference by transmitting a teleconference request from a digital processing system and also transmitting from this system a representation of an image prior to receiving a confirmation of an acceptance to the teleconference request. An apparatus, according to various embodiments of the present invention, is also described for this aspect of the present invention.

According to one embodiment, a teleconference resource may include a calling card feature, a library feature, and/or a picture feature to simplify initiating and responding to teleconferences. A calling card feature, containing configuration information and a full world-wide address, allows a user of a computer system to initiate a teleconference using a selected one of a number of teleconferencing applications, independent of any teleconference application. The full world-wide address complies with the existing standards for identifying a videophone address, in order to provide a universal address. Thus, the address includes full country codes, area codes, and city codes if necessary. A calling card library feature, containing a library of calling card features, stores a list of calling cards, allowing group identification.

A picture feature in some embodiments provides a picture from a sender to a recipient along with a teleconference request message, so that the recipient can see the picture before the teleconference is initiated. In some embodiments, a picture feature at the recipient allows the recipient to view the picture and then choose either to reject the teleconference request or to respond by establishing a teleconference.

In some embodiments, the calling card feature allows the address and configuration information to be used in any of a number of teleconferencing applications, so that a user can establish a teleconference, according to the application and according to the information stored within the feature, by dragging the icon corresponding to the feature onto the icon representing the teleconference application. The address information can identify one or many recipients, and can be transferred to another system and used there to start a teleconference using a different teleconference application on the other system.

The recipient also, in some embodiments, may capture the picture and put the picture in a phone book feature within a calling card feature, associated with the sender's address, so that, subsequent to capturing the picture, the recipient may start a subsequent teleconference with the original user by using this feature. Once a user has collected a number of pictures, the user can set up a menu feature that helps the user select other parties whom the user can include in subsequent teleconferences.

In some embodiments, the feature is also platform independent, if each platform has at least one teleconferencing application. Each platform can initiate or receive teleconference requests and establish teleconferences using the feature.

In some embodiments, the calling card feature provides an indication of the teleconference application of preference, or a list of teleconference applications in an order of preference. The list usually includes the application that created the feature. If the feature were opened without identifying an application, the system initiates a teleconference using the information and address within the feature and the application having the highest preference that is resident on the system. In some embodiments, if none is resident or if the list is not yet established, then a dialog window or request is presented on a display to the user.

In some embodiments, a calling card library feature, containing a library of calling card features, stores a list of calling cards, allowing group identification. From a phone book, a user may select a library of a number of other users and "call" the users identified in the library substantially simultaneously. The library feature may include phone books, and phone books may include libraries.

Some embodiments allow a user to put into the calling card resource all of the following: a list of addresses, an ordered list of applications capable of establishing teleconferences according to the feature, an application selector preference for use when no application on the preferred list is available, a sound volume, a video window location, a video window size, a picture corresponding to at least one other node on a network connectable to the teleconference initiating node such that the other node has an address within the address list, a data file corresponding to each address in the address list such that the data file contains an e-mail and postal address as well as telephone and other data, and other user-defined data. The user can also expand the list.

In another aspect of the present invention, a selector or filter may be used with one or more calling card resources to determine whether a particular calling card resource on a first system may be used to establish a teleconference based on whether the particular calling card resource identifies a second system which has a network type that is compatible with the network type of the first system. As is known in the art, a teleconference cannot be initiated between two systems which have incompatible network types. For example, a system configured as an AppleTalk network type (which uses AppleTalk protocols) is incompatible with another system configured to use TCP/IP networking protocols. According to this aspect of the present invention, a browser program which can read the various calling card resources may select or filter only those calling card resources which identify compatible network types so that a user is not presented with possible calling card resources which identify systems having incompatible network types. In this manner, the browser program determines which calling card resources identify compatible systems and displays representations of those calling card resources while not displaying calling card resources which identify systems having incompatible network types. Thus, this browser program will limit the choices of possible teleconferences which may be initiated to those calling card resources which specify systems operating with a network protocol which is compatible with the system which is running this browser program.

In another aspect of the present invention, a document or file which represents a message from a remote system (e.g., a second system) may be received by a first system and then a calling card resource may be associated with or appended to the message in order for the user of the first system to respond to the message. In one example, a message from the second system may be a teleconference "movie" message which was left by the user of the second system on a storage device of the first system. In effect, the first system acts as a video teleconference answering machine when storing the teleconference "movie" message. A calling card resource may then be embedded into the movie message or appended to or otherwise associated with the movie message. The first system would typically perform this operation of embedding or appending upon receiving the message by also receiving the world-wide videophone address of the second system. Then, the user of the first system may respond to the message by initiating a teleconference using the calling card resource which was embedded into (or appended to or otherwise associated with) the movie message. Similarly, if the message is an electronic mail document, the first system embeds or appends a calling card resource which specifies the information necessary to respond, by initiating a teleconference, to the second system. This enables the user of the first system to respond to the document by initiating a teleconference with the second system.

In another aspect of the present invention, a calling card resource may be saved on a receiving system whenever it receives a teleconference request and the receiving system does not "answer" the request. For example, in those circumstances when the user of the receiving system is not present, the receiving system will typically not "answer" the request and thus no teleconference will be initiated. In those circumstances, the receiving system may save a calling card resource which identifies the calling system so that the user of the receiving system may respond to the calling system by using the saved calling card resource to initiate a teleconference.

DETAILED DESCRIPTION

The present invention will be understood more fully from the detailed description given below and from the accompanying drawings of various embodiments of the invention, which, however, should not be taken to limit the invention to the specific embodiments, but are for explanation and understanding only. Specific circuit devices, components, and processes and numerous details such as specific computer architectures, etc. are set forth in order to provide a thorough understanding of the present invention. In other instances, well-known structures and devices and processes are shown in block diagram form, rather than in detail, in order to avoid obscuring the present invention. However, it will be apparent to one of ordinary skill in the art that the present invention may be practiced without these specific details. In the present description, the terms "computer system", "work station", "machine", and "node" will be used interchangeably so as not to obscure the present invention needlessly. It will be understood that any of these may be replaced with a plurality thereof, or may be replaced with other intelligent systems such as servers or remote machines. Computer systems, servers, work stations, and other machines may be connected to one another across a communication medium including, for example, a network or networks. For simplicity of explanation, the term "communication medium" refers to any medium for communicating including conductors (e.g., common carrier telephone lines) or wireless media (e.g., electromagnetic transmissions) and includes simple point to point systems (e.g., a first modem coupled to a telephone line which is coupled to a second modem) or complex systems where communications originate from a computer in a first LAN (Local Area Network), transit through router systems and/or gateway systems, to a second computer on a second LAN. The term communication medium also refers to the network of networks referred to as the Internet.

Figure 1:
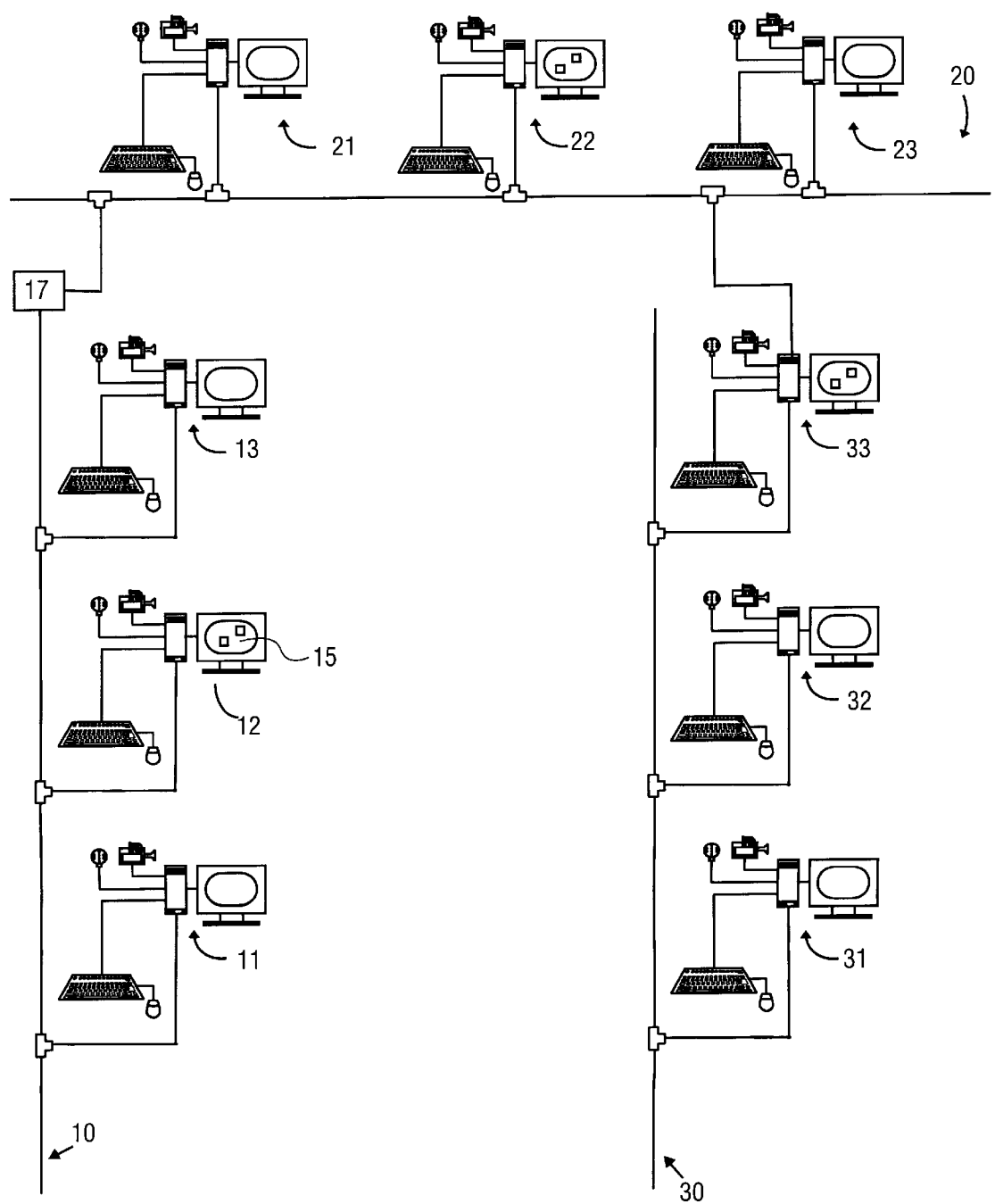
FIG. 1 shows a number of computer systems coupled via several networks, where each computer system may have a teleconferencing application running thereon.

FIG. 1 shows three computer systems 11, 12, and 13 and a router 17 coupled to a network 10, and three computer systems 21, 22, and 23 coupled to another network 20, and another three computer systems 31, 32, and 33 coupled to another network 30.

As shown in FIG. 1, a number of computer systems coupled via a network may each have a teleconferencing application running thereon. A teleconferencing application 15 running on one computer system 12 sends teleconferencing messages over the networks to the teleconferencing applications running on the other computer systems 22 and 33 that are participating in the same teleconference. One computer system on a network may have running thereon a teleconferencing application that is engaged in more than one teleconference simultaneously. Some computer systems on the networks are not engaged in any teleconferencing. As shown in FIG. 1, some computer systems or router systems are coupled to more than one network, such as router system 17 and computer system 33; these computer systems or router systems can exchange information with other computer systems on each of the networks to which they are coupled, and may further serve as conduits (e.g., routers or gateways) by which computer systems on a first network can exchange information with computer systems on a second network. Some of the computer systems shown in FIG. 1 are personal computers having only one user. Furthermore, some of the computer systems may be Macintosh computers, while others operate on non-Macintosh platforms.

A network may be a local network connecting a few machines to one another, or a much wider network connecting large numbers of different types of machines. Many networks, especially wide area networks, connect machines operating on different platforms with different operating systems and different microprocessors, but provide consistent protocols to allow the machines to communicate. Various approaches to networking are known in the art, including distributed networks and centrally administrative networks.

Figure 2:
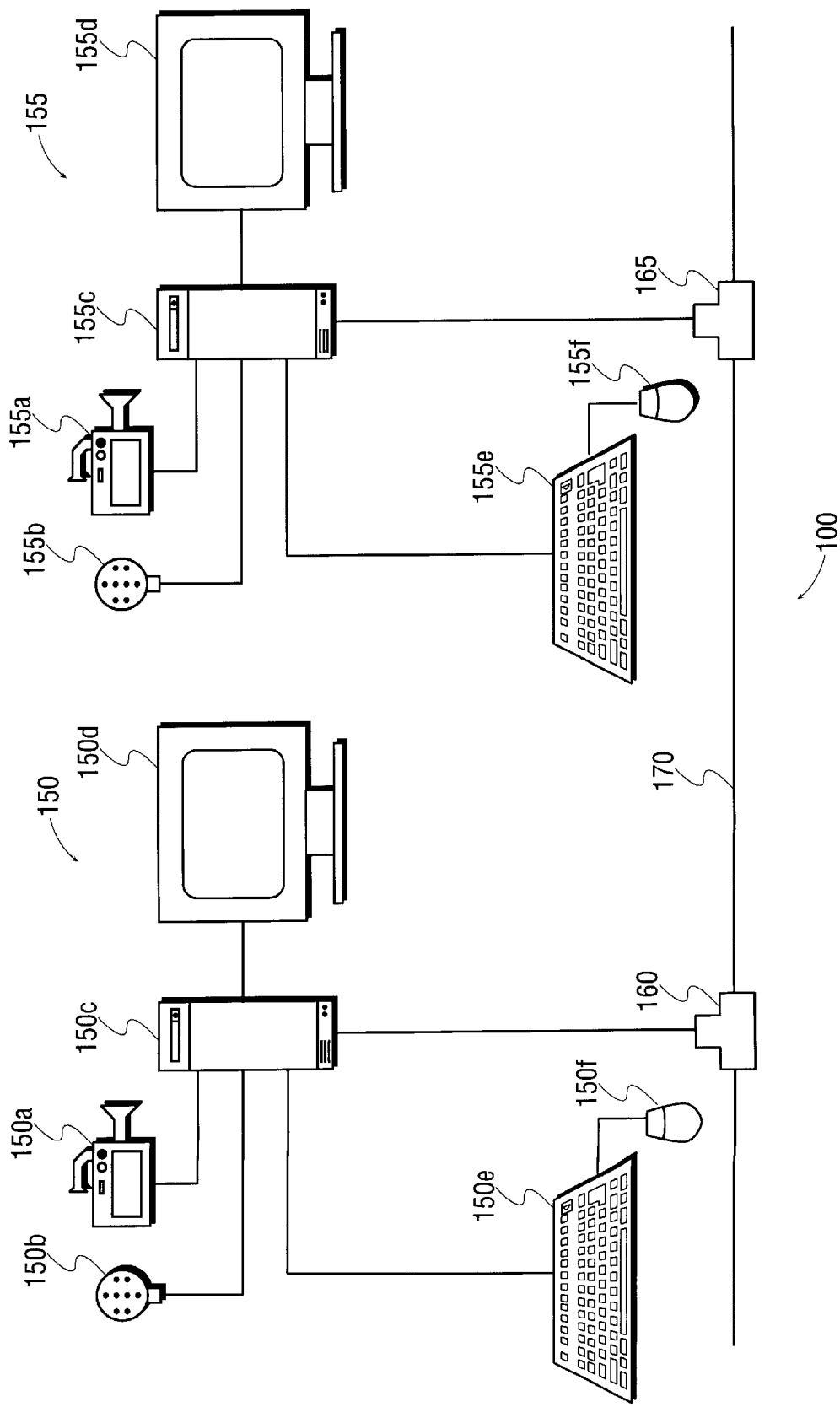
FIG. 2 shows one example of interconnected systems, specifically showing two systems coupled through a communication medium, such as a network medium.

FIG. 2 shows one example of two interconnected systems, specifically showing two systems coupled by a communication medium. Processors 150C and 155C are each connected via a network adapter 160 and 165, respectively, to a network medium 170 which is a communication medium. The network medium 170 may be a digital bus, a video coaxial cable, a fiber optic cable, or other medium through which information may be transferred from one location to another and there may be intervening computer systems (not shown) which route or pass along the transmitted data. It will be understood upon reference to FIG. 2 that other arrangements are possible; for example, each of the processors 150C and 155C may be connected via other network adapters or other communication medium adapters to other network or communication media. Although reference is made to networks and network media, it will be apparent upon reference to the specification of the present invention that other communication media such as a telephone line or other link may be used. It will also be appreciated that the two systems each typically include at least one communication port which is used to couple its computer system to the communication medium. A communication port is typically an interface such as an Ethernet adapter or token ring adapter or "card" or an RS-232 interface (for connection to a modem such as an ISDN or cable modem); other types of interfaces which may be used as a communication port will be appreciated by those skilled in the art.

Each of the computer systems (or digital processing systems) shown in FIG. 2 has a video monitor such as 150D and 155D, a video input such as 150A and 155A, an audio input such as 150B and 155B, a keyboard input (155e or 150e) and a mouse (150f or 155f), and possibly other peripheral input/output devices connected thereto. Computer systems such as 150 and 155 may connect to a number of network media having differing types of media substrates, and further having different network protocols. Processor 150C and 155C each display images on the video monitor 150D and 155D, respectively, and receive inputs from other peripherals. Processors may also be running computer programs, including application programs and transport layer programs, that may call one another and serve one another, exchanging data, addresses, and control signals.

Figure 3:
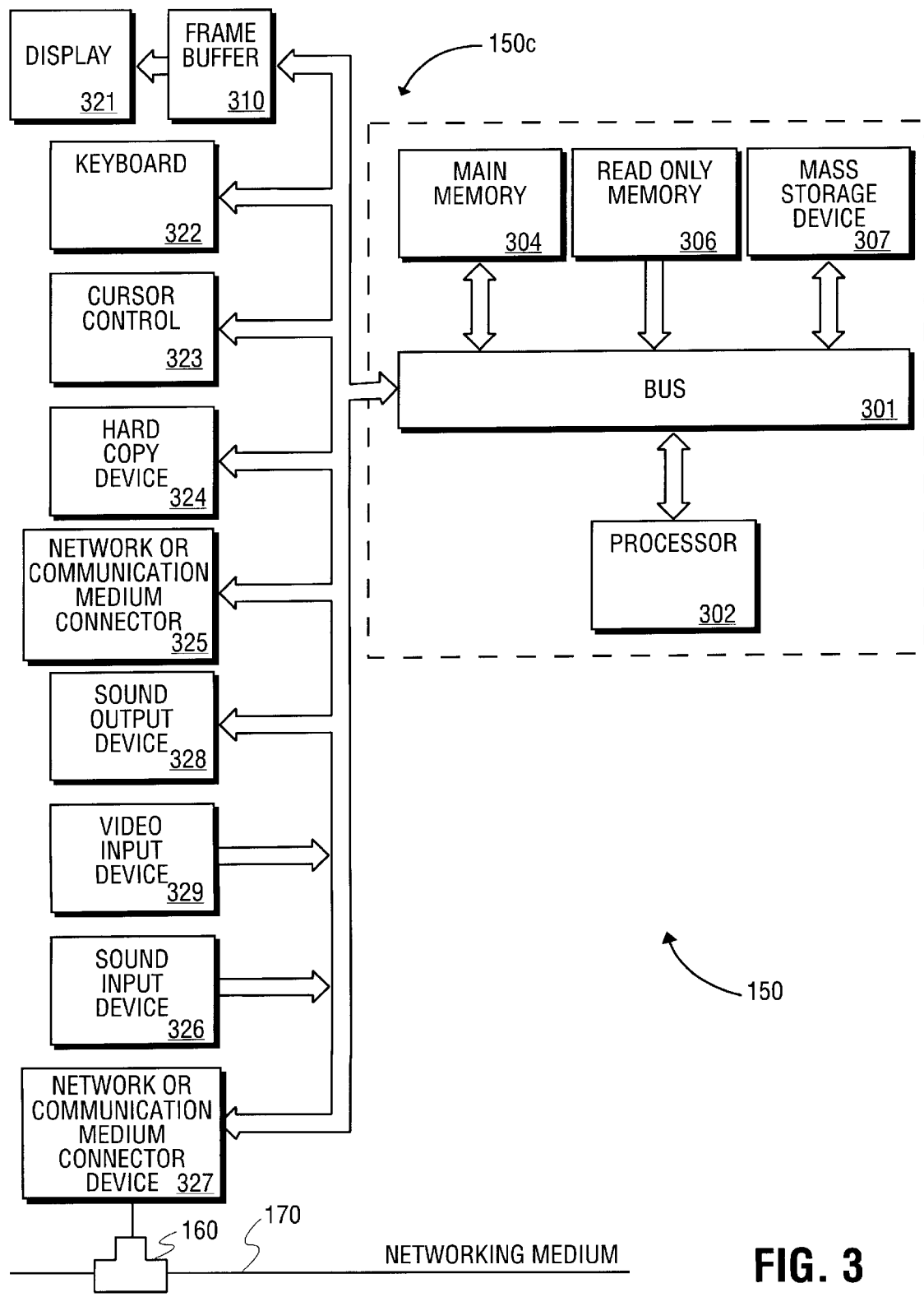
FIG. 3 shows the system components of a general purpose computer system which is coupled to a communication medium.

FIG. 3 shows the system components of a general computer system, such as the system 150, having a number of component devices.

As shown in FIG. 3, a processor 302 is connected via a system bus 301 to a main memory 304, a read only memory 306, and a mass storage device 307. The main memory may be a volatile memory array composed of dynamic random access memory. The read only memory 306 may be composed of a CD ROM, an initialization cache, erasable programmable read only memory, EEPROM, flash memory, or other read only memories. The mass storage device 307 may be configured as a disk drive writing to, and reading from, hard disks, floppy disks, or other storage devices. The processor 302 may be a Power PC microprocessor or an Intel Pentium microprocessor. Processor 302 may have a cache, either a write back or read through configuration, storing frequently used values in a static random access memory or other memory array, the cache in some configurations being coupled directly to main memory 304. Various other intelligent devices may be connected to the bus 301, including direct memory access devices.

Also shown in FIG. 3, various peripherals exchange information via bus 301 with the processor 302, main memory 304, read only memory 306, and mass storage device 307. These peripherals include a display 321, generally a video monitor or LCD. A keyboard 322 is also coupled to the bus 301, permitting alphanumeric entry. A cursor control 323 coupled to the bus 301 may be configured as a mouse or track ball. A sound output device 328, also coupled to the bus 301, may be configured as a loud speaker or a number of loud speakers. A video input device 329 may be configured as a video camera, a scanner, a fax input, or similar device, and is coupled to the processor 302 via bus 301. A sound input device 326, also coupled to the bus, may be configured as a microphone or a sound synthesizer, or may be a telephone connector. Finally, a communication device 327, also coupled to the bus 301, allows communication between any of the above devices and the network medium 170 via the network adapter 160. It will be recognized that communication device 327 could be a modem (e.g., an ISDN or cable modem), or any network interface device, including a token network interface device or other FDDI device. It will also be apparent upon reference to the specification herein described that the communication medium may be any communication link, such as a telephone line or other link, and that the system shown in FIG. 3 may be coupled through the communication device 327, which may be a modem, to another system not shown in the figure. In some embodiments, the networking medium is a digital communication medium, allowing high speed digital communication between computer systems over the network.

A number of human users may be collectively engaged in a teleconference using at least two systems such as 150 and 155. The users may be coworkers sharing work-related information, friends enjoying a personal conversation, or any other group of individuals discussing a subject of common interest. It will be apparent that, although human users are herein described, the computer systems may be servers, automatic database systems, control systems, or any other system capable of receiving and/or sending data. In one example, each of the teleconferencing applications sends and receives sound, video, and other data. In other examples, sound-only teleconferencing applications may be used, for example to exchange voice-only information, or to broadcast speeches, lectures, or music. In still other examples, control-only signals may be exchanged, such as in simple white-board applications. It will be recognized that the sound and other data may also be compressed, or may be in an uncompressed form. During a teleconference, data are addressed to each of the other computer systems having applications engaged in the same teleconference. Depending on whether multi-cast feature is available, a separate packet may need to be sent to each recipient computer system, or it may be that a single packet can be received by more than one recipient.

Figure 5:
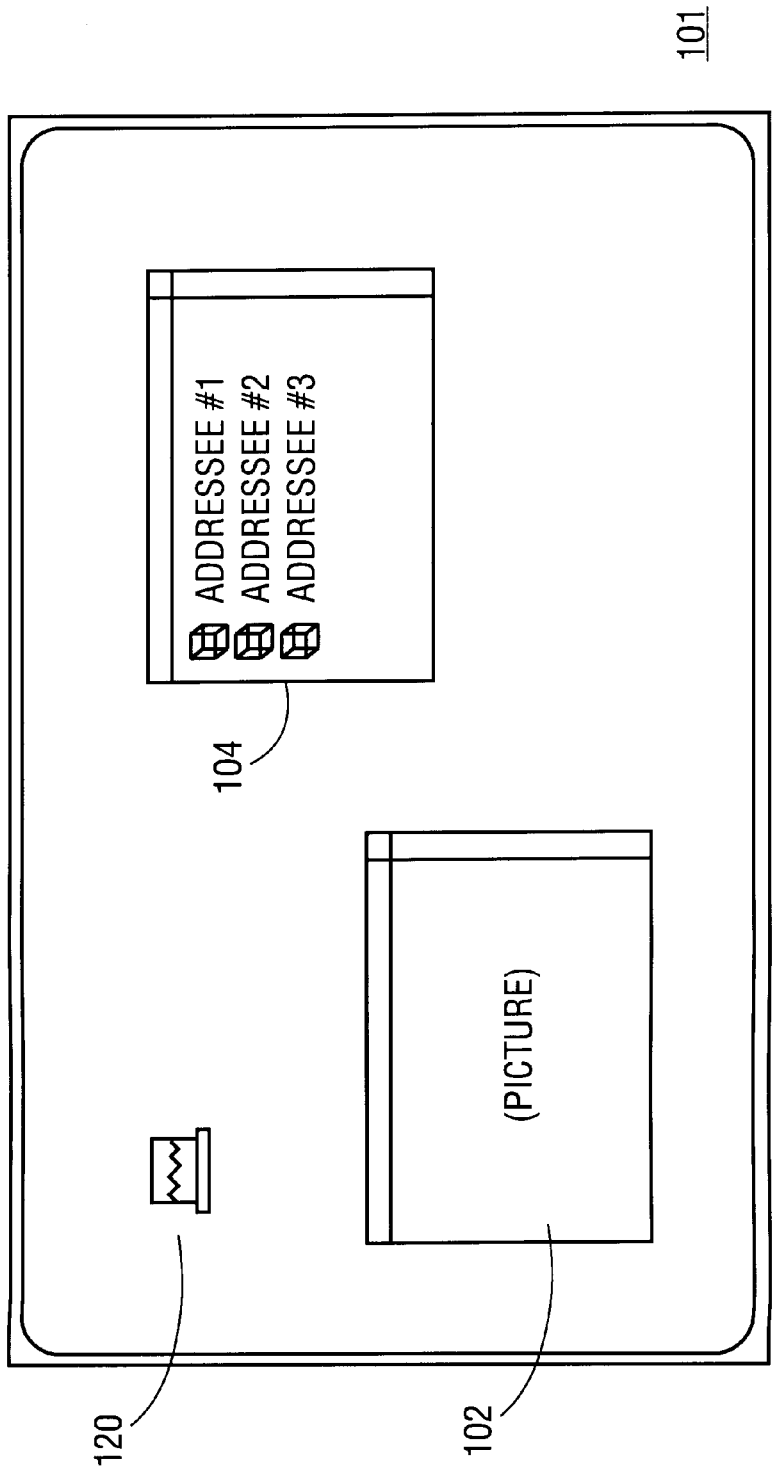
FIG. 5 shows a display of a prior art computer system with a teleconferencing application.

FIG. 5 shows a prior art teleconference system, in which a communication is established by opening a teleconference application. A computer display screen 101 displays at least one graphical object 120 representing a teleconferencing application. The graphical object 120 may be an icon or an entry in a list contained within another object such as a folder or other enclosure. A user initiates a teleconference by opening the application.

The application responds Lo an opening of the application by presenting a user with a list of nodes 104 with which the application may be used to establish a teleconference. The list 104 may be presented as a set of icons, but each entry in the list is customized to the particular application to provide a teleconference according to the requirements and protocols of the particular application. The list 104 is stored in a file or files accessible to the application. Within the particular teleconferencing application, there may be an opportunity to store the addresses of the participants in a teleconference.

When an entry on the list is selected at a first node, such as computer system 150, a message is transmitted over a communication medium, such as a network, to a second system, such as computer system 155 indicating that a teleconference request has been generated and is addressed to the second system. The teleconference request is generated by the application running on the first node according to the address in the list maintained by the application. Generally, a teleconference application is also running on the second system, and when the message is received at the second system, the teleconference may begin. The second system then transmits images of the user of the second system to the first system and these images are displayed as picture window 102 on display 101.

Figure 4:
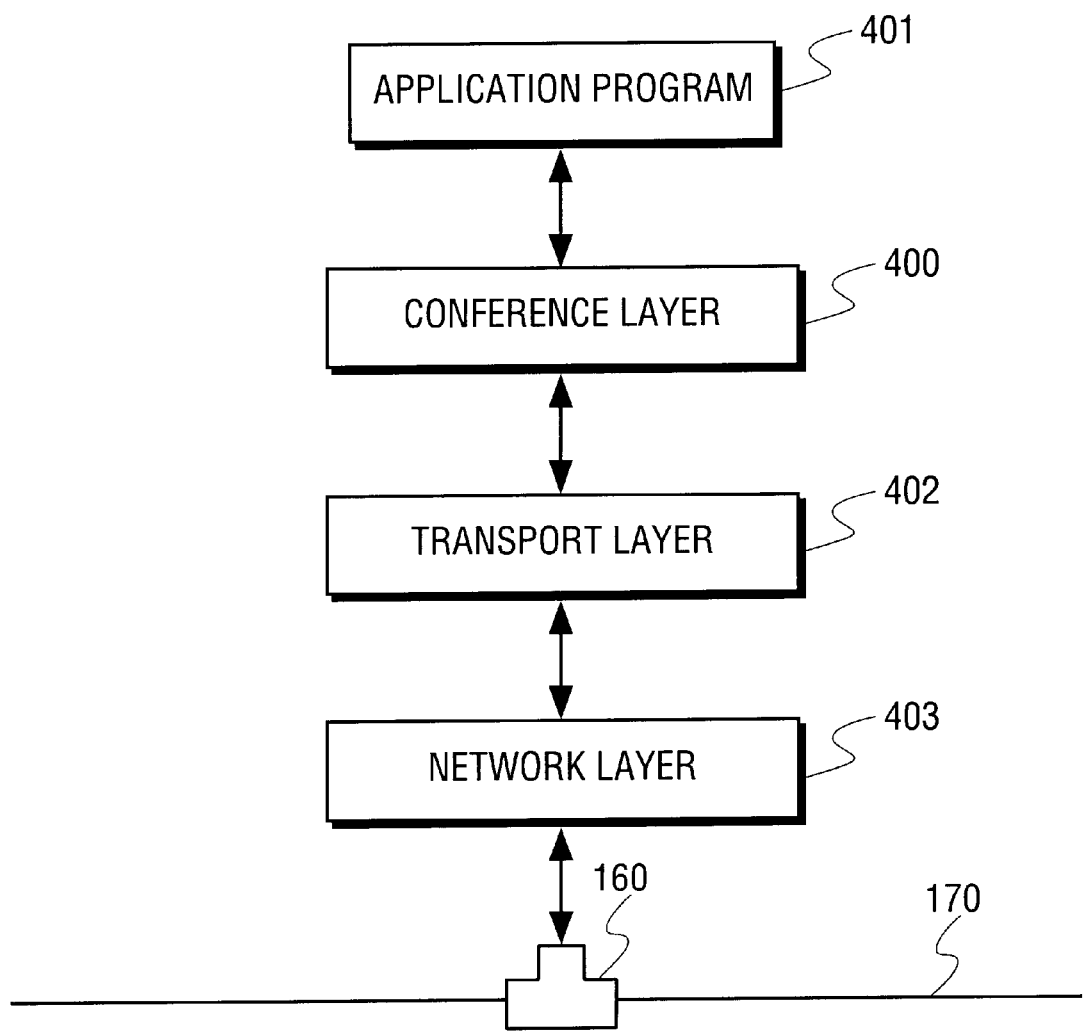
FIG. 4 shows various levels of abstraction which describe the operations involved in teleconferencing.

As shown in FIG. 4, various levels of abstraction show the operations involved in teleconferencing in one embodiment of the invention. Video and other data may be provided to a lower level process by an application such as a teleconferencing application, and the data may be compressed by the lower level process into a packet, addressed to at least one recipient. In one embodiment, the audio and video data are processed by the conference layer 400 and passed to the layers 402 and 403 and then to the communication medium for communication to a receiving processor. It will be appreciated that application program 401 is typically a teleconference application implemented as a computer program which uses other routines in software such as the conference layer 400 as well as software routines in the transport layer 402. It will be appreciated that certain layers provide conventional protocol services for providing communication over a communication medium 170 according to standard protocols such as TCP/IP. It will be appreciated that the transport layer 402 and the network layer 403 may be similar to prior art transport layers and network layers.

The present invention may be implemented by using a browser computer program in the conference layer 400 to read, save and otherwise manipulate calling card resources, making those resources available to any telecommunication program such as the teleconference application program 401. In this way, a teleconference application program provides the capability to obtain an address from the browser in the conference layer, and since this browser program can read calling card resources created independently of the teleconference application, the calling card resource may be used independently of any particular teleconference application program. For example, one teleconference calling card resource may be used and shared with several different telecommunication application programs. As explained herein, the calling card resources will have the necessary conference initiation information, including the standard videophone address having a full world-wide addressing specification. When any particular teleconference application attempts to start a teleconference, it may invoke the browser in the conference layer which then can be used to read calling card files and to display them in a dialog box as explained below. It will be appreciated that the browser according to the present invention may also allow a user to enter an address rather than selecting a calling card to initiate a teleconference.

Figure 6:
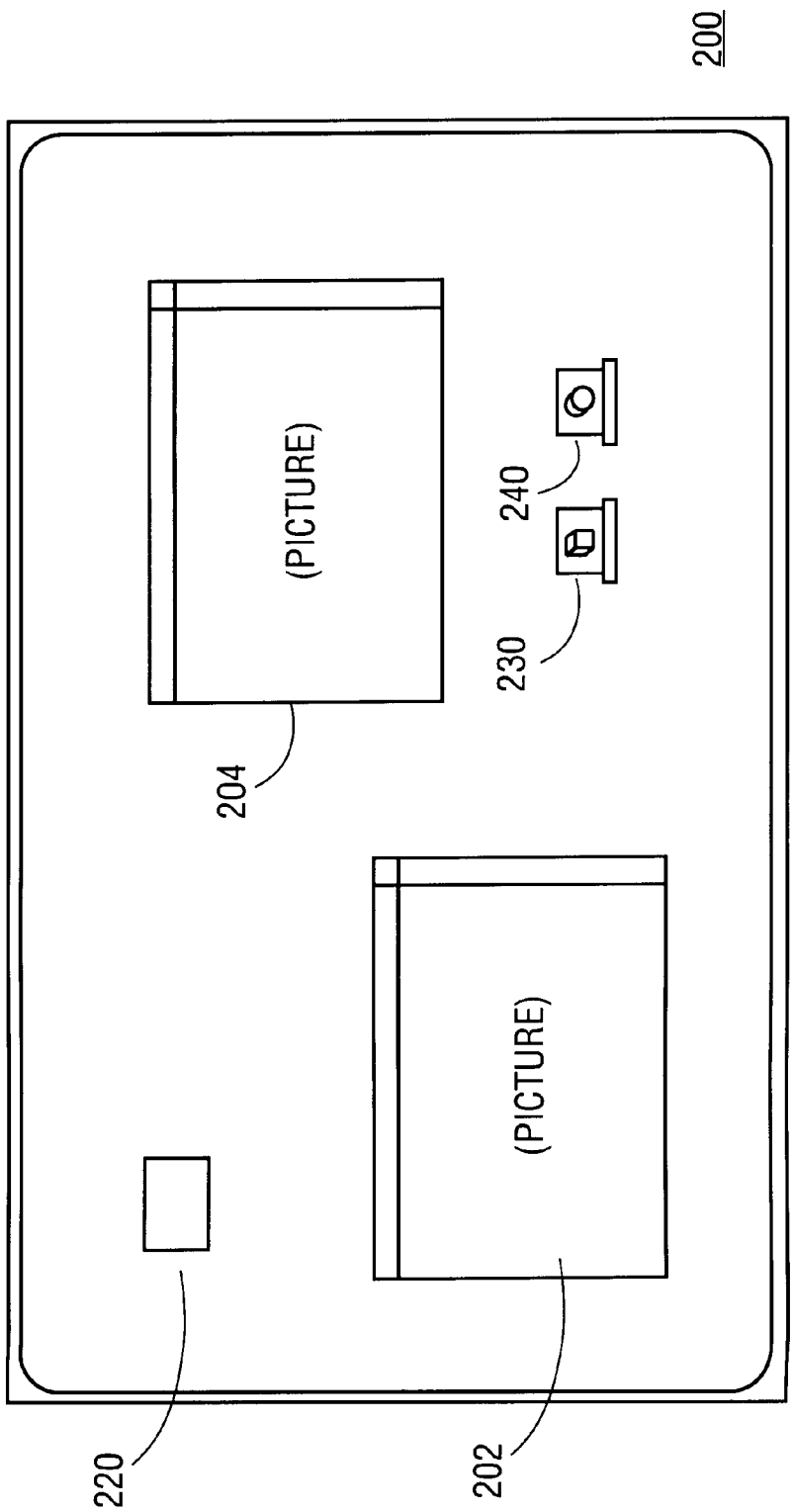
FIG. 6 shows the display of a digital processing system according to the present invention.

FIG. 6 shows a graphical display corresponding to one embodiment of the present invention. A graphical representation of a calling card resource or information (or simply "calling card") 220 is shown as an icon. It will be understood that the resource 220 can be represented in other forms, such as a document within a folder. Also shown are a number of graphical objects representing two different teleconferencing applications 230, 240. The applications are capable of establishing multiple teleconferences simultaneously, according to any combination of resources and applications. Moreover, each teleconferencing application may share and use the same calling card resource.

In one embodiment of the present invention, a calling card resource 220 having one or more records, stores in each record information pertaining to at least one other computer system, such as a system in a particular group, with which a teleconference might be established. In one embodiment, some of the records in the calling card resource 220 have an address and other information, and several of the records each also include a picture corresponding to the other computer system identified in the record. With respect to some of the records, the picture is a scanned photograph of one of the individual human users of the other computer system. With respect to other records, the picture is a computer generated image or graphic. In one embodiment, some of the records do not have pictures while other records do have pictures.

As will be described below, several methods of establishing a teleconference are possible. For example, an application 230 or 240 may be opened, and from within the application, a number of calling card resources may be selected. Alternatively, calling card resources 220 may be dragged onto an application 230 or 240. A third method allows a user to open a resource directly, either presenting a user with a list of applications, or selecting automatically an application of preference. The preference may be selected from within the resource or may be set within a preference file available to the system. Other methods for establishing or initiating a teleconference will be apparent upon reference to the present disclosure.

The calling card 220 can be used in either sending or receiving. In sending, the calling card 220 may be accessed by any of a number of applications 230, 240 that may be resident on the computer system containing the calling card 220. According to one embodiment of the present invention, a user can initiate a teleconference quickly and simply, using the calling card, in any of three ways: by selecting an icon or other identifier on a computer screen using a mouse and cursor, by dragging the icon representing the resource onto an icon identifying a teleconferencing application or vice versa, or by launching an application and then from inside the application accessing the resource. Other methods of initiating an application will be appreciated by those skilled in the art upon reference to the description of the present invention.

As stated above, in some embodiments, the present invention allows additional parameters to be associated with the calling card itself. In one example, an application of preference is stored, so that when the resource is accessed from outside any particular application, the resource launches the application of preference associated with the calling card and automatically sends a teleconference request to every address stored in the resource, and also displays any pictures stored in the resource. In other embodiments, a dialog box (or other user interface request format) queries a user for an identification of an application to be used.

If an application is launched and the resource is selected from within the application, the launched application accesses the resource. A teleconference is initiated, using information stored in the application and information stored in the resource. For example, some preferences may be stored in the application, such as video frame rate, sound loudness level, location of a video window on the screen, etc. or these and other data may be stored in the resource. Information from the resource may include a picture stored in records within the resource, such that when the resource is selected, the pictures are presented on a computer monitor screen, and the user may view the pictures while a teleconference initiation request is being provided to a network.

Some embodiments of the present invention allow a user initiating a teleconference request by using a calling card to select some of the records from the calling card, and only call the ones selected. In one embodiment, this selection is accomplished by selecting pictures on the monitor screen, using a mouse and a mouse button. In other embodiments, however, all addresses stored in a calling card are called when a calling card is accessed, and the call is placed immediately and automatically once the application and calling card are accessed.

Each address is universal and operates across any of a number of teleconference applications. Thus, the user is not limited in the selection of applications with which he or she may use the calling card. The universality of the calling card also allows the user to transfer the entire resource to another computer, even on another network or in another area of the world, thereby enabling the other computer to use the resource in conjunction with any of a number of applications resident on the other computer.

In one embodiment, the calling card may even be transferred across platforms, so that a group including computers operating on one platform may expand to include computers operating on a different platform, in a different country on a different network, via the Internet. A member of the group can transfer the calling card (corresponding to the group) to the newly included computer, allowing the new computer to initiate calls easily.

The card may be edited by a user, to include new fields or parameters. For example, a data file may be appended to a record of a card or to the card itself, so that when a call is initiated the data file is transmitted. In some embodiments, one or more data files are opened at the sending system when a call is made, so that the caller can view information regarding the party being called. These features may be of great value in certain commercial settings where a caller may want to view additional customer files when calling a customer or supplier, or in certain scientific or academic settings where the caller and the party being called are jointly working on a document. Additional phone numbers, or a computer version of call-forwarding, may also be available, with a list of addresses stored in the calling card.

As stated above, the calling card is also used to receive teleconference requests. In most computer networks, teleconference requests include an indication of the requester's own address, so that a response may be addressed specifically to the requester. (In other networks, particularly very small networks of just a few computers, all messages are addressed to all other computers in the network.) In some embodiments, the calling card allows the system receiving a teleconference request to search memory or external data storage for additional information, including picture images, pertaining to the caller, so that a party being called can display additional information, before the party being called accepts the call.

In some embodiments, data stored in a calling card may be simultaneously accessed by multiple applications, so that while a teleconference is on-going, for example, the parties to the teleconference may, by exchanging data with other applications, efficiently fax or otherwise transfer data among the parties. By separating teleconferencing data from teleconferencing applications, several embodiments of the present invention allow non-teleconferencing applications to share information with teleconferencing applications by sharing a resource that is efficiently and easily edited.

According to one embodiment of the present invention, when the teleconference request is received, a search is conducted at the receiving computer system for all calling card resources stored in memory or in nonvolatile storage media that are components of or are coupled to the receiving computer system. All calling card resources are searched, and any match in one or more fields is identified. In some embodiments of the present invention, a priority of calling card resources is predetermined at each computer system, such that the records in the calling card having a higher priority are used to the exclusion of lower ranking calling cards. In other embodiments, all records from all calling cards are presented to a user of the computer system, who may select one of the records.

If one or more records is selected, any picture or pictures associated with the record or records is presented on a computer screen at the computer system at which the teleconference request is received. Thus, the receiver of a teleconference request can view a picture or pictures stored in the calling card resource before deciding whether to accept or reject the call.

If an incoming call is accepted, a teleconference may be established according to preferences stored in the record or records. These preferences may include a preferred teleconferencing application, or the user may be presented with an opportunity to select a teleconference. Thus, the searching is performed independent of any particular teleconferencing application.

Among the types of information stored in the resource, a user might include the size and location of a video window. A user may store other information pertaining to a potential caller, and recall this information upon receipt of a teleconference request.

Similarly, a calling card resource can be used to initiate a teleconference request. A user at a computer system having one or more calling card resources may select one of the calling cards, and one or more records, and transmit a teleconference request to the addresses stored in the selected records. Because the records contain a complete "global" (world-wide) address, the teleconference can be requested from anywhere in the world, from any computer system. Thus, it is a "universal" address. The request can be made to a computer system operating on a different platform, over the Internet or World Wide Web or other wide area network, or may be made locally or a LAN. A complete world-wide address complies with existing (and future) standards for identifying a videophone address and includes full country codes, area codes, and city codes (if necessary).

Furthermore, the calling card resource is an independent resource, in that it may be copied onto a disk or sent over a network as data, to any other computer system that may or may not have an application in common with the computer system from which the resource is sent. Thus, when a new user joins work group, that new user may receive a file containing the calling card resource, and may use the calling card to establish a teleconference using any application that a member may have. Thus, calling cards are completely transferable, even over different platforms, and provide a world wide addressing for any node thus recorded.

Figure 7A:
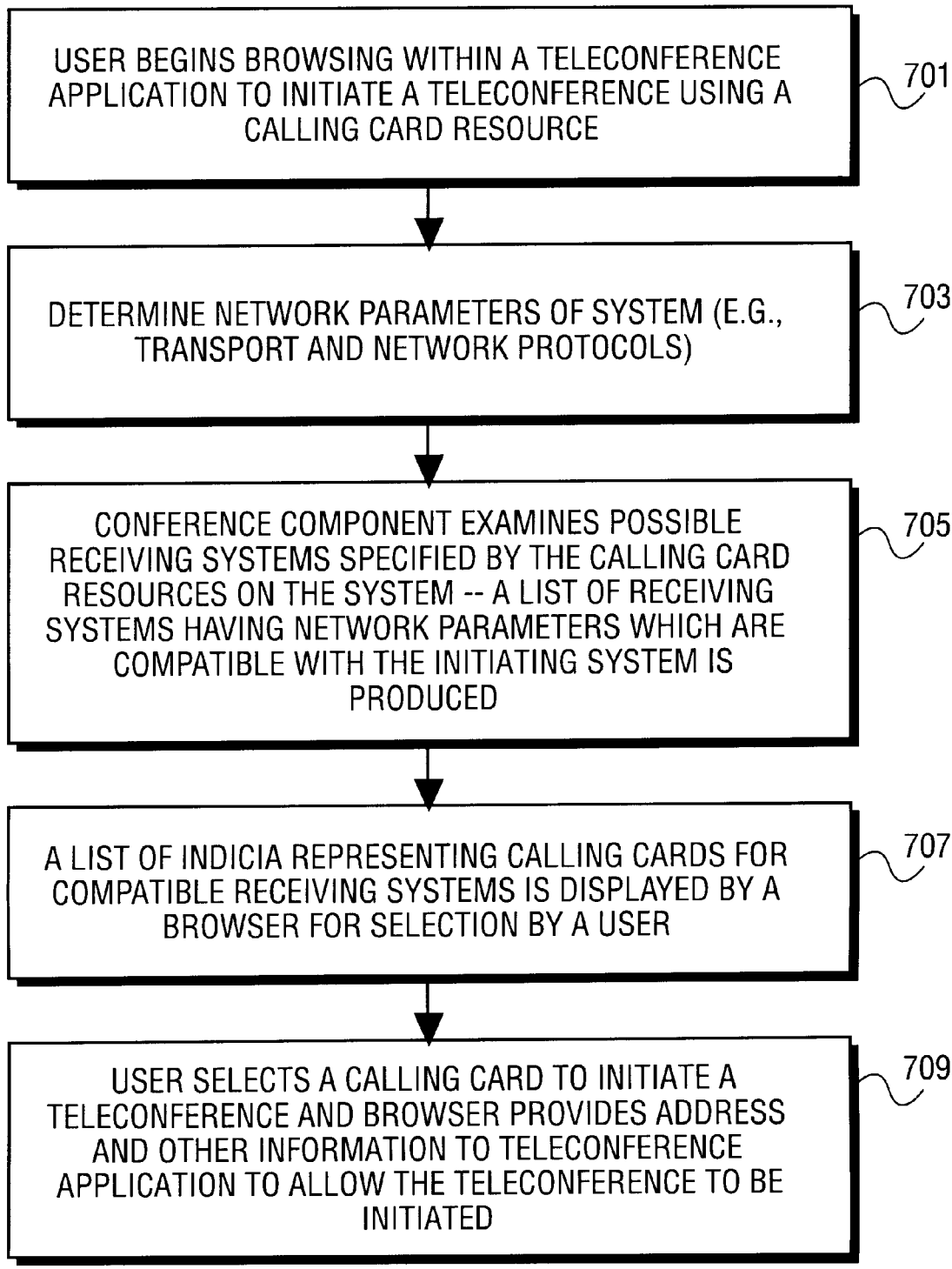
FIGS. 7A, 7B and 7C show methods of the invention for using a teleconference resource.
Figure 7B:
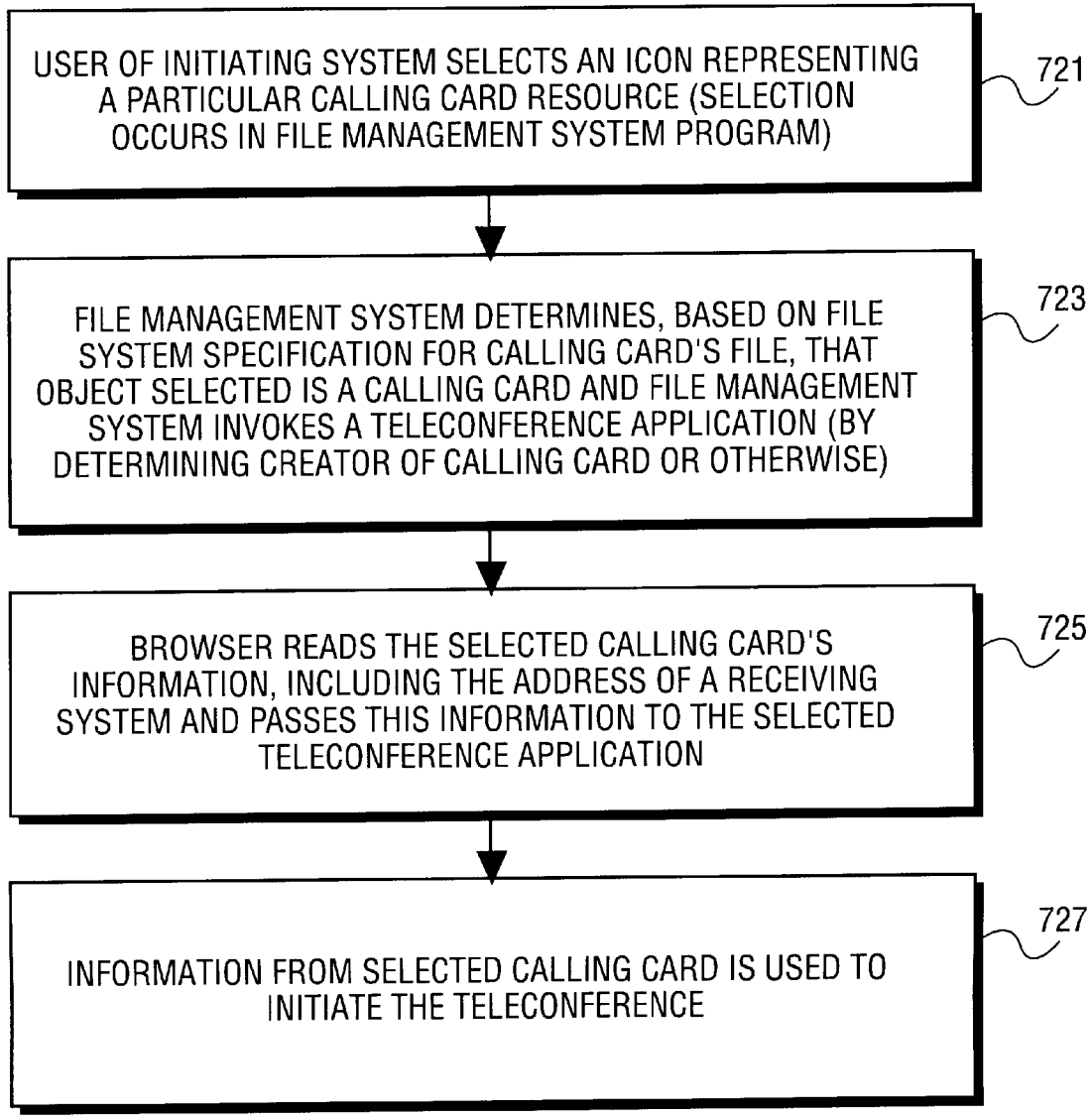
Figure 7C:
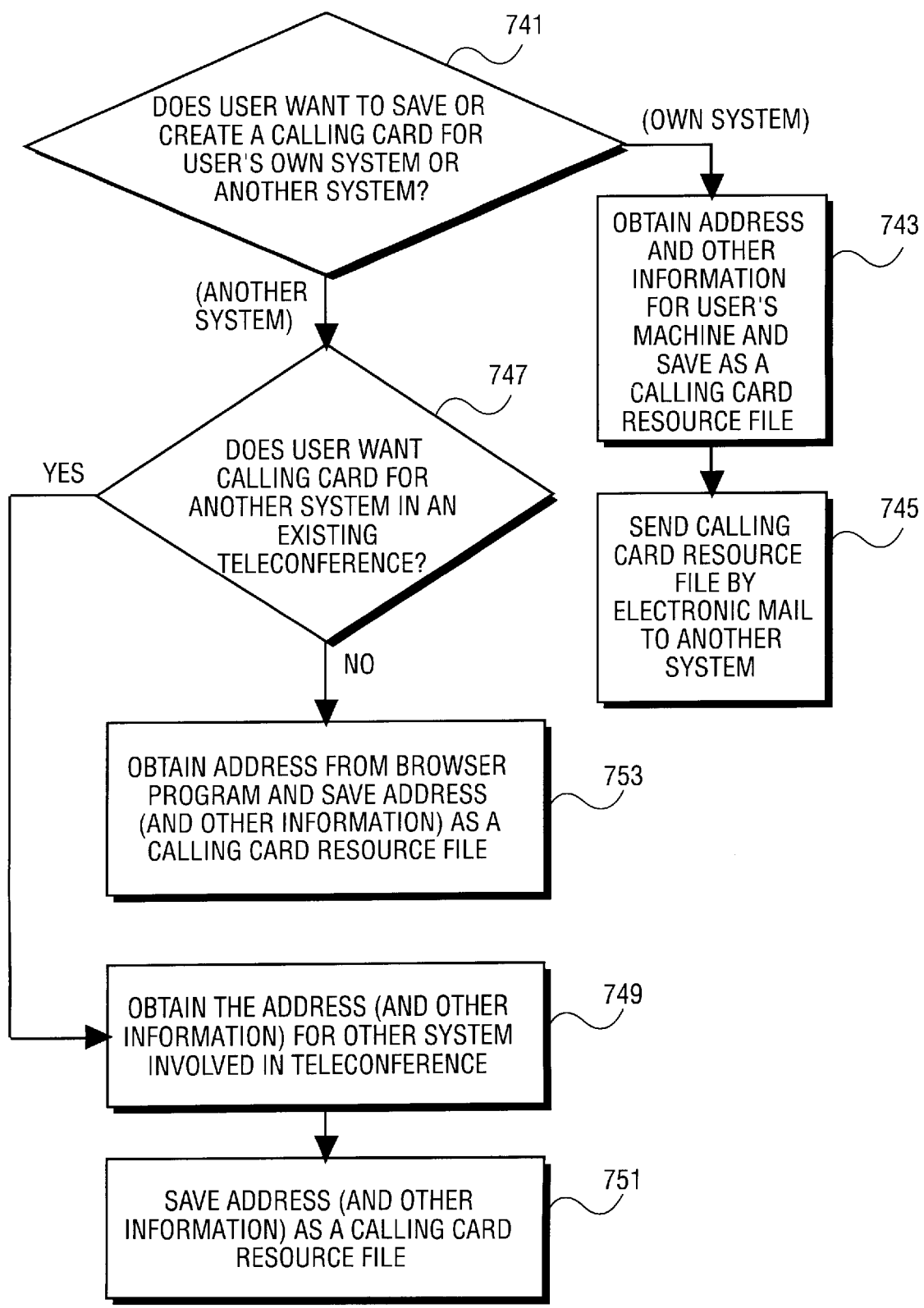

FIGS. 7A, 7B and 7C illustrate a particular implementation for providing teleconference resources which are independent of any teleconferencing application such that several different teleconferencing applications may utilize such a resource.

FIG. 7A shows a particular implementation for initiating a teleconference while the user is within a particular teleconference application program which has been launched and is running. The method shown in FIG. 7A begins in step 701 in which the user begins browsing within the teleconference application to initiate a teleconference by using a calling card resource. In step 703, the system determines the network parameters of the system on which the user is operating. This will typically involve determining the network and transport protocols which the system is currently using. For example, the system will determine whether a network parameter is a TCP/IP or AppleTalk protocol. Typically, this determination will occur by invoking a software component in the conference layer. In step 705, a conference component then examines the possible receiving systems specified by the calling card resources on the system. A list of receiving systems having network parameters which are compatible with the user's system is produced. In this manner, the user's system filters out possible receiving systems which are incompatible with the current network parameters of the user's system. In step 707, a list of indicia representing calling cards for the various compatible receiving systems is displayed by a browser software program, typically implemented in the conference layer of the present invention, so the user may select a particular calling card in order to initiate a teleconference. In step 709, the user selects a particular calling card to initiate a teleconference and the browser provides the address and other information to the teleconference application to allow the teleconference to be initiated. The filtering operation described above may also take into account transport/network pairs that are not installed or not operational or not active such that receiving systems falling into these categories are not displayed to the user. In this manner, the initiation of a teleconference is more efficient and less confusing to a user.

FIG. 7B shows an implementation of the present invention wherein a teleconference is initiated by directly selecting a calling card resource rather than by first launching a teleconference application and then selecting a calling card resource within a teleconference application. In step 721, the user of an initiating system selects an icon which represents a particular calling card resource. This selection typically occurs in a file management system program, such as the Macintosh Finder (or Microsoft Windows' "File Manager"). In response to the selection of an icon representing a particular calling card resource, the file management system determines, in step 723, that the object which was selected is a calling card and the file management system invokes a teleconference application software program which created the calling card (as specified by the "creator" information in the file management system maintained for the calling card). In this case, the "creator" teleconference application will be the selected teleconference application. If there is no creator information, a teleconference application program is selected from a list of programs which is maintained by the operating system (e.g., a list maintained by a system extension such as "Easy Open" for the Macintosh Operating System from Apple Computer, Inc. of Cupertino, Calif.). In this circumstance, the application program selected from the list is then launched as the selected teleconference application. If there is no program which is capable of opening a calling card, then an error message may be displayed (e.g., "an application to open the file could not be found") or the user may be asked to select a teleconference application program. After the selected teleconference application is launched, it invokes a teleconference browser software program (which may be part of a system such as in a Quicktime Conferencing extension in the Macintosh Operating System). Then the browser, in step 725, reads the selected calling card to determine the information maintained by the calling card. Typically this includes the address of a receiving system as well as other necessary information. This information is passed to the selected teleconference application which may be specified in the calling card resource as indicated in this description. In step 727, the information from the selected calling card is used to initiate the teleconference with the selected teleconference application.

FIG. 7C shows various methods for creating and/or saving calling card resources. If the user wants to save or create a calling card for information concerning the user's own system (as determined in step 741), then as shown in step 743, the address and other information for the user's machine is obtained and saved as a calling card resource file. Then the user may optionally, as indicated in step 745, send the calling card resource file specifying the user's system by electronic mail to another system. This allows the receiver of this calling card resource to call the user's system by using the calling card resource which was created in step 743. If the user wants to create a calling card for another system as determined in step 741, then the system determines in step 747 whether the user wants to create a calling card for another system involved in an existing teleconference. If the answer from step 747 is no, then in step 753, the system obtains the address from the browser program and saves the address and other information as a calling card resource file. Typically, this address information may be entered manually by the user and then saved using the browser program of the present invention. If the user wants to create a calling card for another system involved in an existing teleconference, then the address and other information for the other system involved in the teleconference is obtained in step 749. In step 751, this information is then saved as a calling card resource file which may be used later to initiate a teleconference with the other system. It will be appreciated that steps 749 and 751 may be repeated separately for each system involved in an existing teleconference to create separate calling cards for each such system, or steps 749 and 751 may create a group calling card which identifies the multiple systems involved in the existing teleconference (such that a future teleconference with all such systems may be initiated by selecting one group calling card).

Figure 8:
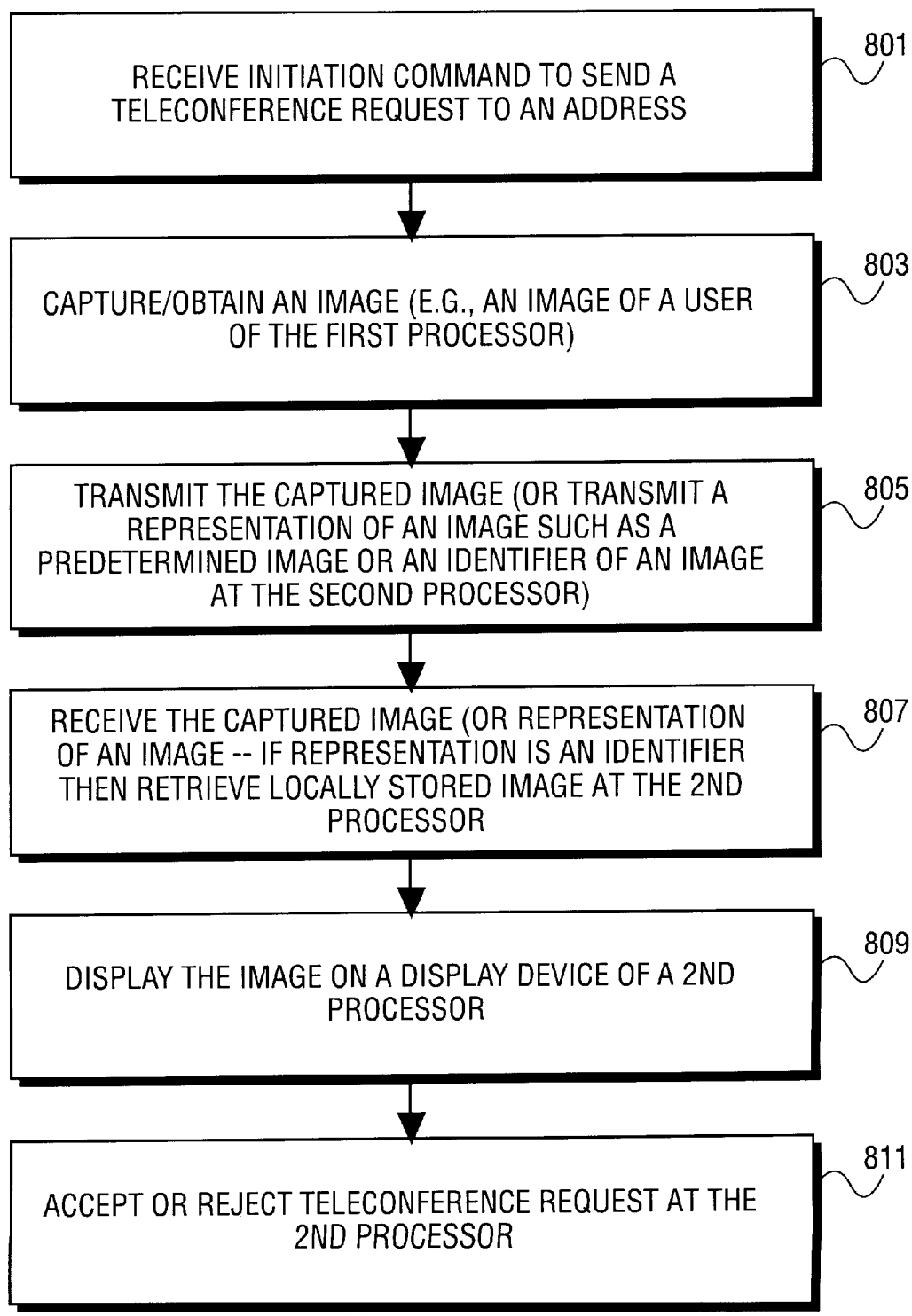
FIG. 8 shows an embodiment of a method for using a picture feature according to the present invention.

FIG. 8 illustrates one embodiment of an aspect of the present invention which uses a "picture feature." The method shown in FIG. 8 begins with step 801 in which an initiation command at a first processor causes a teleconference request to be addressed to a second processor. Typically, a user of the first processor will select from a menu to select the initiation command or, as with the present invention, the user may select a graphical representation of a calling card resource displayed on a display device of the first processor in order to cause the teleconference request to be sent to the address. The next step 803 is optional. In this step 803, an image of a user of the first processor (or some other image) captured by a camera device is obtained. The camera device may be videoinput device 329 as shown in FIG. 3.

In step 805, the captured image or a representation of an image is transmitted from the first processor to the second processor. The representation of an image may be a predetermined image or an identifier of an image which is stored at the second processor. In step 807, the captured image is received at the second processor or the representation of an image is received at the second processor. If the representation is an identifier of an image stored at the second processor, then that image identified by the identifier is retrieved. Then in step 809, the image is displayed on a display device of the second processor, allowing a user of the second processor to accept or reject the teleconference request as shown in step 811.

One embodiment of the present invention can be stored in a computer readable medium such as a main memory, a read only memory, or a mass storage device, or in other external storage devices such as magnetic discs or other magnetic media. In such an embodiment, the main memory contains a set of program instructions that, when executed by a processor of a computer system, perform steps according to embodiments of the present invention. It will be apparent that other means for storing programs are available, and that some systems provide several different sources of stored programs to the same processor. For example, application-level programs may be stored in main-memory or on a magnetic disc, while lower layer programs may be stored in a special cache or in ROM.

Figure 9:
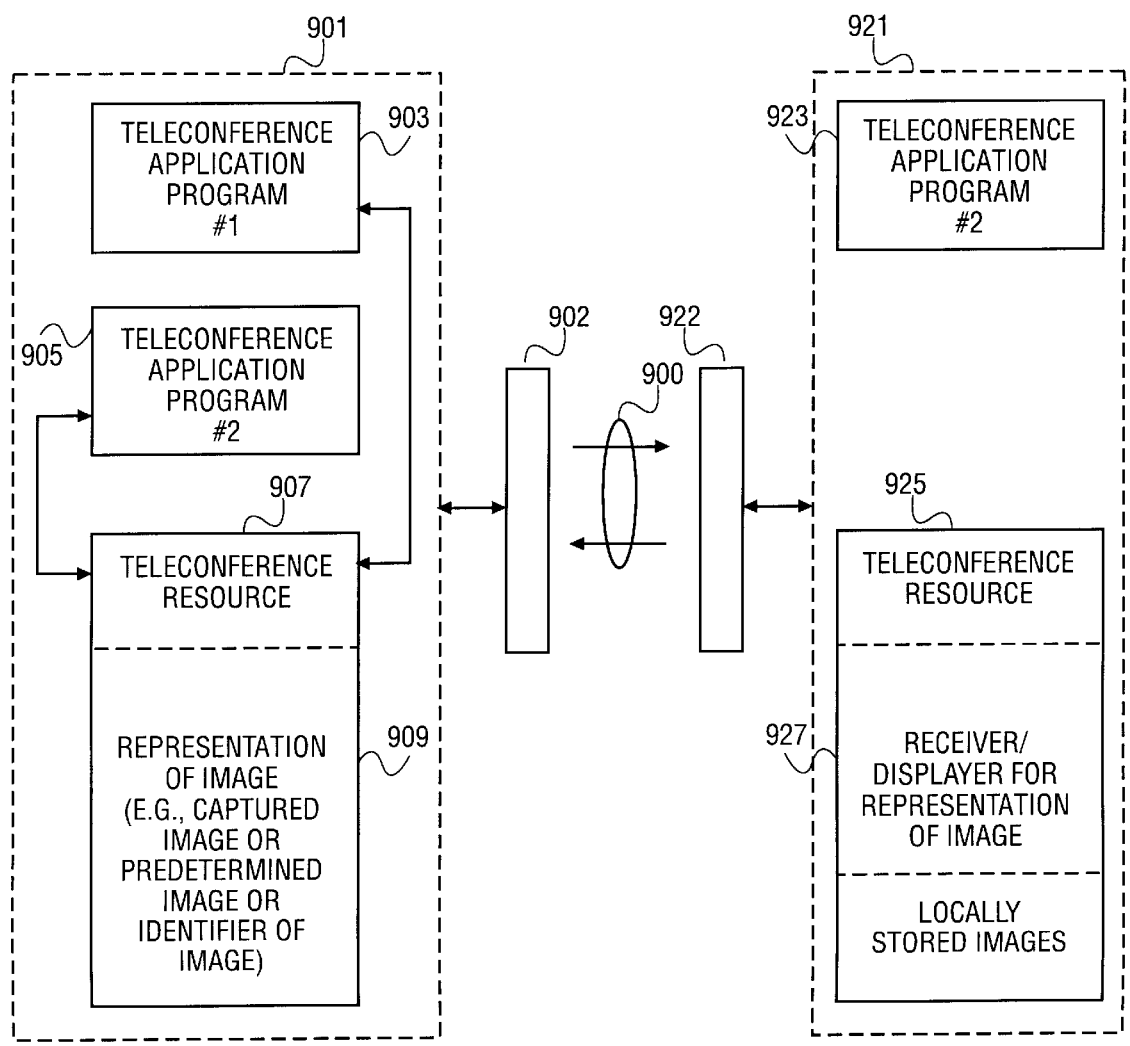
FIG. 9 shows an embodiment of a computer readable medium of the present invention.

FIG. 9 shows computer readable media 901 and 921 for two different computer systems which are coupled together by a communication medium 900 through communication ports 902 and 922. It will be understood that computer readable media 901 and communication port 902 are typically parts of one computer system, such as computer system 150. Similarly, the computer readable media 921 and the communication port 922 are parts of another computer system, such as the system 155. These systems are interconnected by a communication medium 900 as shown in FIG. 9.

The computer readable medium 901 includes two teleconference application programs, specifically programs 903 and 905, stored in this computer readable medium. It will be appreciated that this media may be mass storage devices or a combination of mass storage devices and random access memory. Also stored in a computer readable media 901 is the teleconference resource 907 which is shown linked or associated with the two different programs 903 and 905. Also stored in the computer readable media 901 is a representation of an image 909 which may be the captured image as described above or a predetermined image or an identifier of a particular image stored at a processor which may be addressed through a teleconference request.

The computer readable medium 921 also includes a teleconference application program, in this case the application program 2 shown as program 923. The computer readable medium 921 may include a teleconference resource 925 which is similar to the teleconference resource 907 and may be used by the user of the second system to initiate teleconferences from the second system. The computer readable medium 921 also includes a program or other resource 927 which receives and displays the representation of an image transmitted from the first system through the communication medium 900. Furthermore, locally stored images which are used by a teleconference resource, such as resource 925, are stored in the computer readable media 921. These locally stored images may be identified by the identifier transmitted under control of the teleconference resource 907 as described above in connection with FIG. 8.

Figure 10:
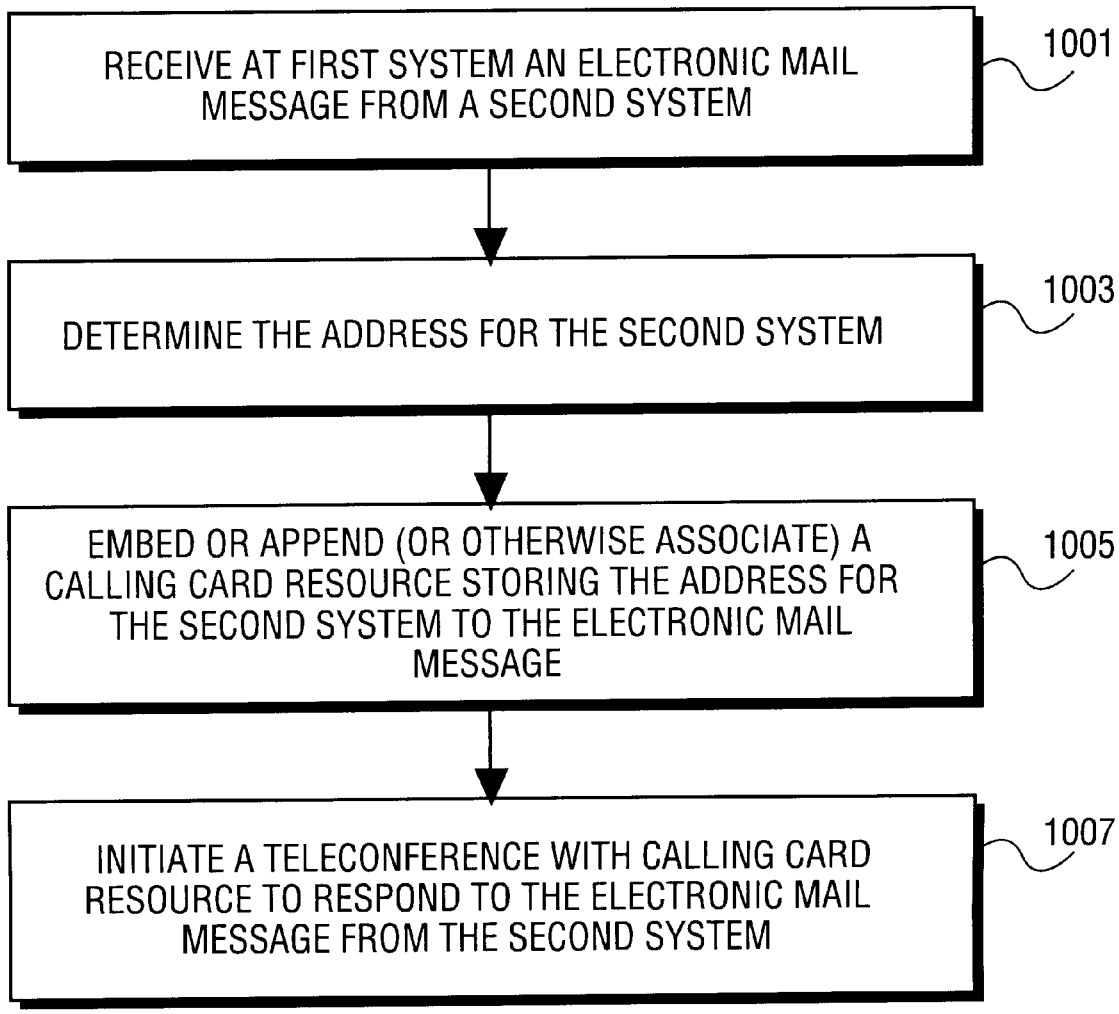
FIG. 10 shows a flowchart of an embodiment of the invention.

Another aspect of the present invention which uses calling card resources will now be described by referring to FIG. 10. According to this aspect, a calling card resource may be appended to or embedded in or otherwise associated with an electronic mail message received from another system. In step 1001, a first system receives an electronic mail message from a second system. In step 1003, the first system determines the address for the second system and other necessary information in order to create a calling card resource file. Then in step 1005, a calling card resource is embedded or appended or otherwise associated with the electronic mail message. This calling card resource may then be used in step 1007 to initiate a teleconference with the calling card resource to respond to the electronic mail message from the second system. An example of this method may occur when a receiving system receives a video teleconference message which in effect is a movie saved on the receiving system. If the user of the receiving system is not present, then the movie is saved on the receiving system which in effect functions as a videophone answering machine. Embedded within the movie or otherwise appended or associated with the movie message is a calling card resource which identifies the address of the sending system. The user of the receiving system may then at a later time use the calling card resource associated with the movie message in order to respond to the movie message by initiating a teleconference with the sending system. In another example, the sending system may send an electronic mail document and a calling card resource may be embedded with or appended to or otherwise associated with the electronic mail document. The user of the receiving system can then return or respond to the electronic mail document by invoking the calling card reference which is appended to or embedded in or otherwise associated with the electronic mail document.

It will be appreciated that a calling card may be created whenever a receiving system receives a call and the call is not answered. In this manner, the user of the receiving system may return or respond to the call at a later time by using the calling card resource created in this manner. It will also be appreciated that a calling card resource may be saved each time a call (e.g., teleconference initiation request) is made to a receiving system. It will also be appreciated that while a typical calling card resource will refer to a two-way communication link and that each system in the link can both receive and transmit information, it is possible for a calling card resource to refer to a one-way communication link, wherein one system only transmits information and the other system or systems only receive information.

Although the present invention will be understood more fully from the detailed description given above and from the accompanying drawings of various embodiments of the invention, the description and drawings should not be taken to limit the invention to the specific embodiments, but are for explanation and understanding only. It will be apparent to one of ordinary skill in the art that the present invention may be practiced without these specific details.

I claim:

1. An apparatus in a digital processing system for initiating a teleconference comprising:
   a processor coupled to a display;
   a memory coupled to said processor, said memory storing at least one teleconferencing application program, said processor executing said teleconferencing application program to initiate said teleconference using information stored in said memory independently of said teleconferencing application program such that another teleconferencing application program stored in said memory is capable of using said information.

2. An apparatus as in claim 1 further comprising:
   a camera coupled to said processor; and
   wherein said memory further stores a resource program which causes said camera to capture an image of a user of said digital processing system upon initiation of said teleconference and which causes said image to be transmitted to a remote processor.

3. An apparatus as in claim 1 wherein said information is associated with a graphical representation which is displayed on said display and wherein said teleconference is initiated by selecting said graphical representation on said display.

4. An apparatus as in claim 1 wherein said memory also stores another teleconferencing application program and wherein said processor is capable of executing said another teleconferencing application program using said information to initiate said teleconference.

5. An apparatus as in claim 1 wherein said information includes a stored, predetermined image which is for transmission to a remote processor upon initiation of said teleconference.

6. An apparatus as in claim 1 wherein said teleconference is with a remote processor and wherein said information is capable of being transferred to another digital processing system and stored therein and, when executed with another teleconferencing application program on said another digital processing system, is capable of initiating another teleconference with said remote processor.

7. A communication system comprising said apparatus of claim 1 and further comprising:
   a communication medium coupled to said processor;
   another processor coupled to said communication medium, said information specifying an address of said another processor.

8. An apparatus for initiating a teleconference on a digital processing system, said apparatus comprising:
   a means for processing;
   a means for storing information and at least one teleconferencing application, said means for storing being coupled to said means for processing, said means for processing executing said teleconferencing application to initiate said teleconference using said information which is stored independently of said teleconferencing application such that another teleconferencing application program stored in said means for storing is capable of using said information.

9. An apparatus as in claim 8 wherein said information is associated with a graphical representation which is displayed on a display coupled to said means for processing and wherein said teleconference is initiated by selecting said graphical representation.

10. An apparatus as in claim 8 wherein said means for storing also stores another teleconferencing application program and wherein said means for processing is capable of executing said another teleconferencing application program using said information to initiate said teleconference.

11. A method for initiating a teleconference comprising:
    retrieving information stored in a memory containing an address and configuration data for said teleconference;
    retrieving a teleconference application program stored in said memory and using said information to initiate a teleconference with said teleconference application program, said information being independent of said teleconference application program such that another teleconference application program is capable of using said information.

12. A method as in claim 11 further comprising transmitting an image representative of an initiator of said teleconference to said address.

13. A method as in claim 11 wherein said information is stored independently of s aid teleconferencing application program.

14. A method as in claim 11 wherein said information is associated with a graphical representation which is displayed on a display window of a file management program, and wherein said teleconference is initiated by selecting said graphical representation on said display.

15. A method as in claim 11 wherein said teleconference is capable of being initiated using said information and another teleconference application program.

16. A method as in claim 11 wherein said information comprises an indication of the application that created the information, such that, if the information is selected, the application that created it, if resident on the same computer system, initiates a teleconference using the information and wherein if the application that created the resource is not resident on the same computer system as the information then an application selector is initiated, said application selector being either a list of applications each having a unique priority identifier corresponding thereto, the application having the highest priority indicator corresponding thereto initiating a teleconference using the information in said resource, or a dialog presentation, such that a user may select an application, said selected application initiating a teleconference using the information.

17. A method as in claim 11 wherein said information comprises at least one resource preference, said resource preference comprising at least one of the following:
    a list of addresses;
    an ordered list of applications capable of establishing teleconferences according to the information;
    an application selector preference for use when no application on the ordered list is available;
    a sound volume;
    a video window location;

a video window size;

a picture corresponding to at least another node on a communication medium and an address within the address list for said another node; and a data file corresponding to each address in the address list such that said data file contains an e-mail and postal address as well as telephone and other data.

18. A method for creating an entry in information for use in initiating a teleconference, the method comprising the steps of:

receiving a teleconference request;

extracting from the teleconference request an address corresponding to a node on a communication medium that provided the teleconference request to the communication medium; and creating an entry in a calling card resource, the entry storing the address, the calling card resource being usable by at least one teleconferencing application, the resource being able to be stored in memory independently of any teleconferencing applications that may be in memory.

19. A method for searching entries in information for use in initiating a teleconference, and initiating a teleconference comprising the steps of:

receiving a plurality of search terms;

examining the entries in the information for a record having fields that match the search terms if a match exists, and that provides the closest entry if no match is found to provide a found entry; and receiving an indication as to whether a user wishes to establish a teleconference with the found entry, and if so, establishing a teleconference according to the preferences corresponding to the found entry in the information.

20. A computer readable medium containing executable computer program instructions in a digital processing system, said instructions when executed in said digital processing system causing said digital processing system to perform the steps of:

retrieving information from a memory containing an address and configuration data for a teleconference retrieving a teleconference application program from said memory and using said information to initiate said teleconference with said teleconference application program, said information being independent of said teleconference application program such that another teleconference application program stored in said memory is capable of using said information.

21. A computer readable medium as in claim 20 wherein said steps further comprise:

transmitting an image representative of an initiator of said teleconference to said address.

22. A computer readable medium as in claim 20 wherein said information is stored independently of said teleconferencing application program.

23. A computer readable medium as in claim 20 wherein said information is associated with a graphical representation which is displayed on a display window of a file management program, and wherein said teleconference is initiated by selecting said graphical representation on said display.

24. A computer readable medium as in claim 20 wherein said teleconference is capable of being initiated using said information and another teleconference application program.

25. A computer readable medium as in claim 20 where said information comprises at least one resource preference having at least one of the following:

a list of addresses;

an ordered list of applications capable of establishing teleconferences according to the information;

an application selector preference for use when no application on the ordered list is available;

a sound volume;

a video window location;

a video window size;

a picture corresponding to at least another node on a communication medium and an address within the address list for said another node; and a data file corresponding to each address in the address list such that said data file contains an e-mail and postal address as well as telephone and other data.

26. A method for initiating a teleconference from a first processor comprising:

transmitting a representation of an image to a second processor; and prior to receiving a confirmation of an acceptance to begin said teleconference, displaying said image at said second processor.

27. A method as in claim 26 further comprising:

capturing a first image of an initiator at said first processor, wherein said representation which is transmitted is said first image.

28. A method as in claim 27 wherein said step of capturing occurs upon the initiator initiating said teleconference.

29. A method as in claim 26 wherein said image is a predetermined image.

30. A method as in claim 27 further comprising:

selecting a representation which has associated information which specifies an address of said second processor, and wherein said capturing step occurs in response to selecting said representation.

31. A method as in claim 26 wherein said representation identifies said image which is stored on a medium at said second processor.

32. A method as in claim 26 wherein after displaying said image, a user at said second processor is provided with an option to either reject a teleconference request or to provide said acceptance to establish said teleconference.

33. An apparatus in a digital processing system for initiating a teleconference, said apparatus comprising:

means for transmitting a teleconference request from a first processor;

means for transmitting a representation of an image to a second processor prior to receiving a confirmation of an acceptance to said teleconference request.

34. An apparatus as in claim 33 further comprising:

means for capturing a first image of a user at said first processor, wherein said representation which is transmitted is said first image.

35. An interconnected combination of systems comprising said apparatus of claim 33 and further comprising:

a communication medium coupled to said first processor;

said second processor coupled to said communication medium; and a means for displaying coupled to said second processor, said means for displaying providing a display of said image prior to an acceptance of said teleconference request.

36. A computer readable medium in a digital processing system, said computer readable medium containing executable computer program instructions which, when executed in said digital processing system, cause said system to perform the steps of:

transmitting a teleconference request from said digital processing system;

transmitting a representation of an image prior to receiving a confirmation of an acceptance to said teleconference request.

37. A computer readable medium as in claim 36 wherein said steps further comprise:

capturing a first image of a user at said digital processing system, wherein said representation is said first image.

38. A computer readable medium as in claim 37 wherein said capturing step occurs upon said user initiating said teleconference request.

39. A computer readable medium as in claim 37 wherein said steps further comprise:

selecting a representation which has associated information which specifies an address of a second processor to which said teleconference request is directed, and wherein said capturing step occurs in response to selecting said representation.

40. A method for initiating a teleconference comprising:
determining a network parameter of a first system;

examining at least one information record, which may be used to initiate a teleconference, to determine whether a second system specified by said one information record is compatible with said network parameter;

displaying an indicia of said at least one information record if said second system is compatible with said network parameter.

41. A method as in claim 40 wherein said network parameter comprises a network protocol and wherein said one information record comprises information which is independent of a first and a second teleconference application such that said one information record may initiate a teleconference with said second system using either said first or said second teleconference application.

42. A method as in claim 41 wherein said displaying step comprises not displaying said indicia if said second system is not compatible with said network parameter.

43. A method for initiating a teleconference comprising:

receiving at a first system a message from a second system;

determining an address of said first system;

associating at said first system an information record having said address with said message, said information for initiating a teleconference with said second system.

44. A method as in claim 43 wherein said information record comprises information which is independent of a first and a second teleconference application such that said one information record may initiate a teleconference with said second system using either said first or said second teleconference application.

45. A method as in claim 43 wherein said message is stored at said first system and comprises a sequence of image frames.

46. A method as in claim 43 wherein said message is stored at said first system and comprises an electronic mail document.

* * * * *